Nov. 5, 1940.   C. D. PETERSON   2,220,541
TRANSMISSION GEARING
Filed April 13, 1938   3 Sheets-Sheet 1
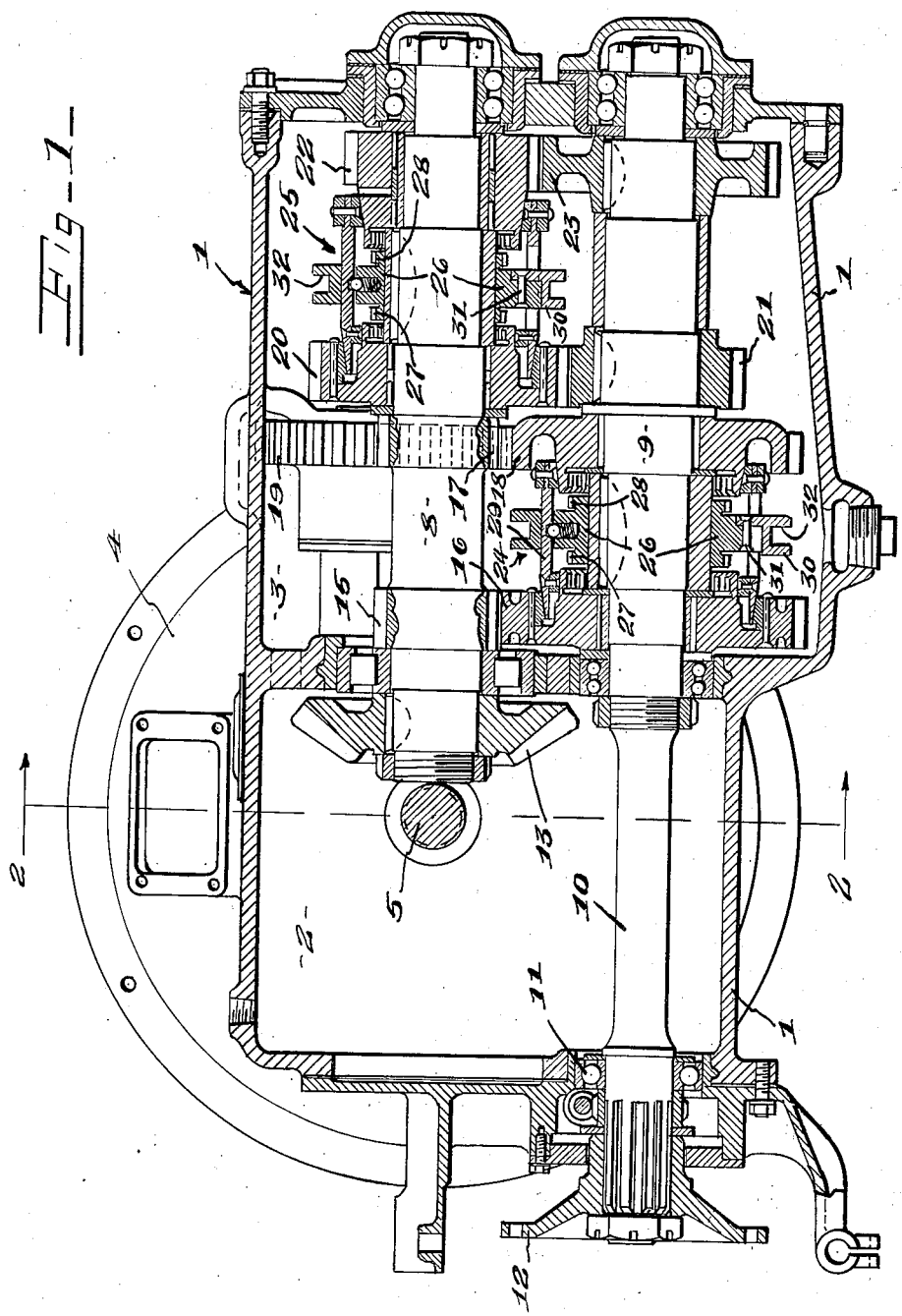
INVENTOR.
Carl D. Peterson
BY Bodell & Thompson
ATTORNEYS

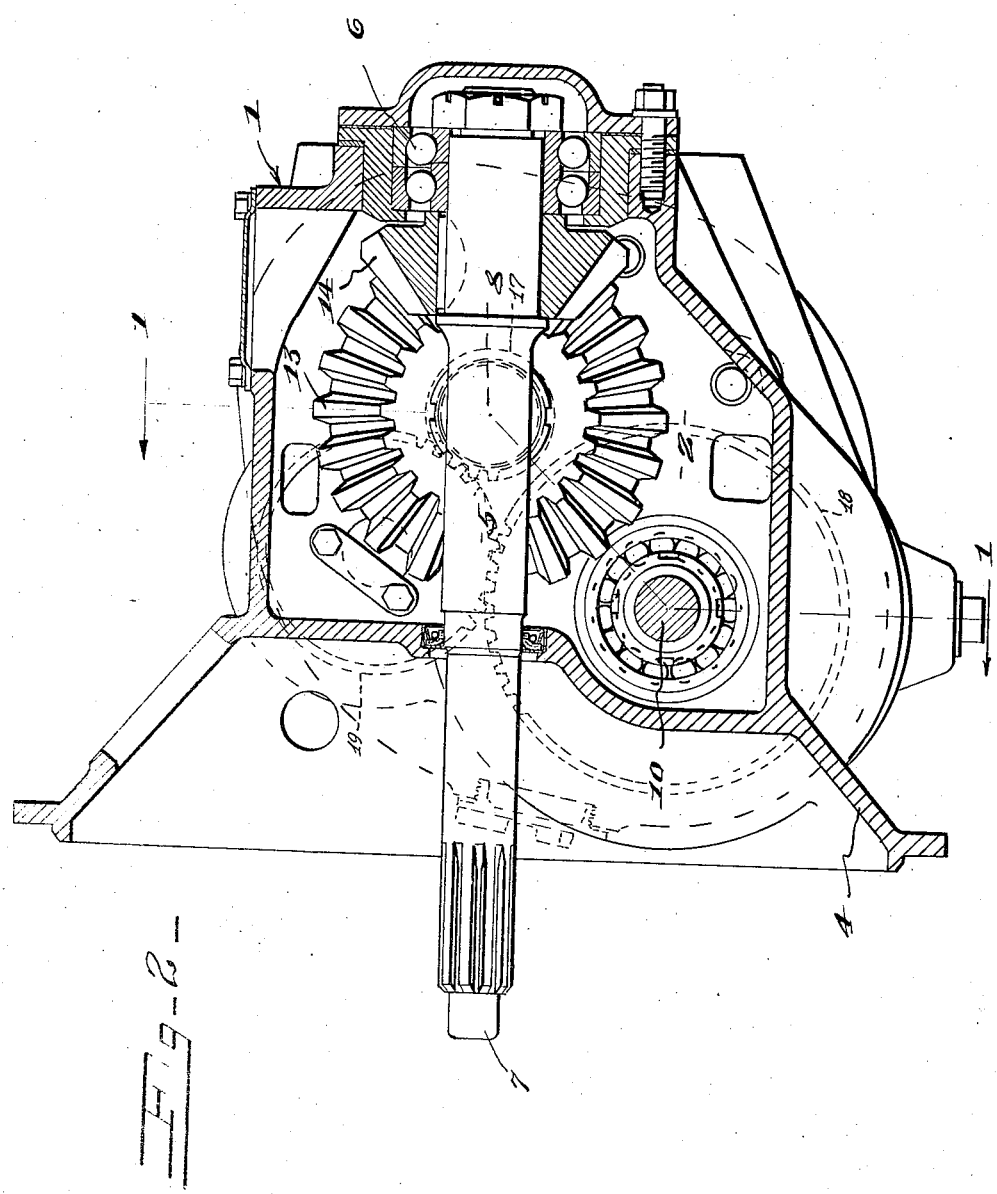

Nov. 5, 1940.  C. D. PETERSON  2,220,541
TRANSMISSION GEARING
Filed April 13, 1938     3 Sheets-Sheet 3
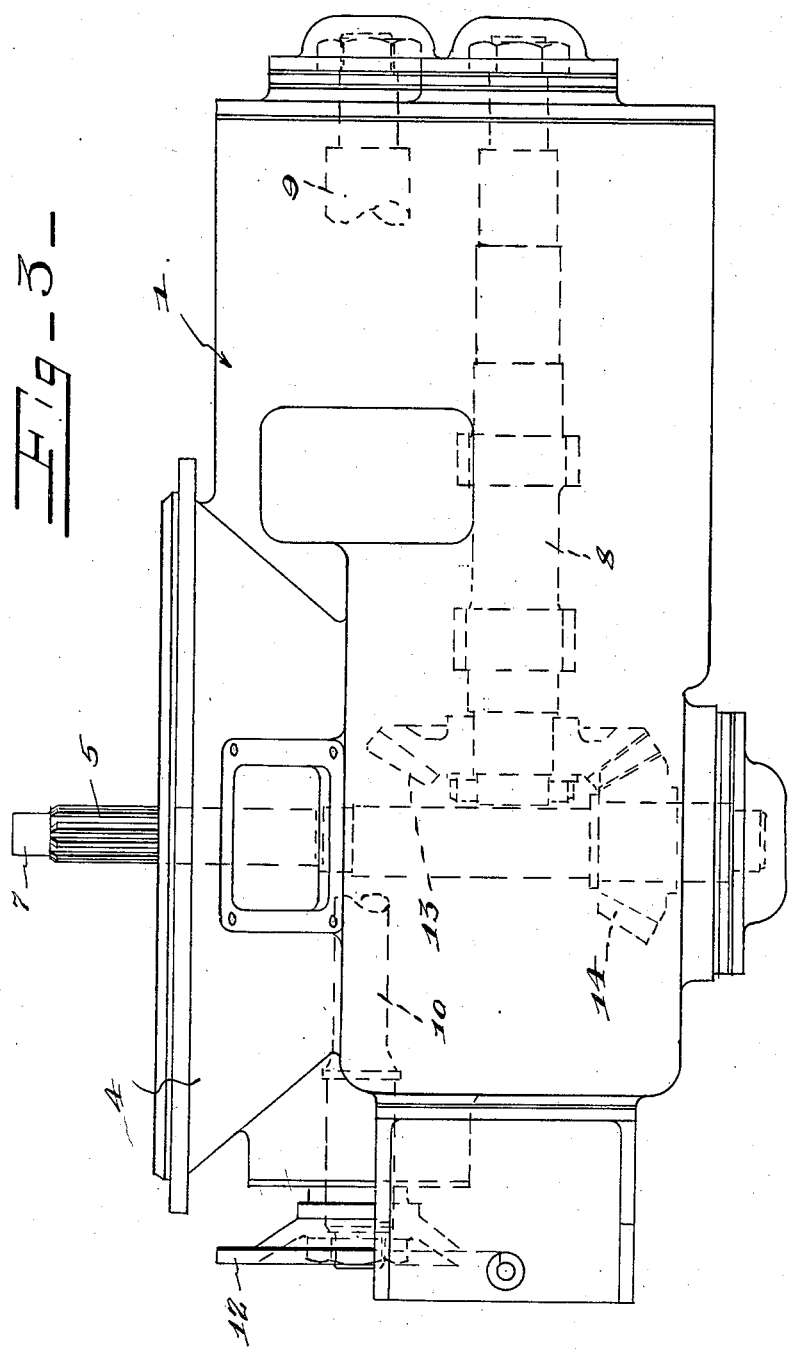

Patented Nov. 5, 1940

2,220,541

UNITED STATES PATENT OFFICE 2,220,541

TRANSMISSION GEARING

Carl D. Peterson, Toledo, Ohio

Application April 13, 1938, Serial No. 201,789

1 Claim. (Cl. 74—326)

This invention relates to transmission gearings for motor vehicles, and has for its object a compact transmission gearing, particularly for situations, such as engine-in-the-rear vehicles, as buses, etc., where the transmission gearing is arranged at an angle to the axis of the engine of the vehicle, and the power transmitted through the transmission gearing is delivered thereby at the same end of the transmission gearing that the power is delivered into the gearing from the engine.

It further has for its object an indirect drive transmission gearing including parallel input and output shafts with trains of gears between them with an especially compact arrangement of the trains of gears between the input and output shafts by which all speed changes, including reverse, are effected through synchronizing clutches and all located within a minimum space and consisting of a minimum of parts.

The invention consists in the novel features and in the combinations and constructions hereinafter set forth and claimed.

In describing this invention, reference is had to the accompanying drawings in which like characters designate corresponding parts in all the views.

Figure 1 is a sectional view on the plane of line 1—1, Figure 2, of this indirect drive transmission gearing.

Figure 2 is a sectional view on the plane of line 2—2, Figure 1.

Figure 3 is a plan view, more or less diagrammatic, of this transmission gearing and looking downwardly in Figure 1.

The transmission gearing comprises generally, a gear box formed with a clutch housing, a drive shaft or clutch shaft having a bearing at one end in the gear box and extending transversely of the gear box at one end thereof into the clutch housing, gearing including shafts journalled in the gear box in parallelism to each other and extending in a general direction at an angle to the clutch shaft, and means operable to effect different speed ratios between the latter shafts and gearing between the clutch shaft and one of the latter shafts, the other of the latter shafts extending beyond the end of the shaft geared to the clutch shaft and crosswise of the clutch shaft and having means at its end off which the power is taken.

1 designates the gear box formed with front and rear compartments 2, 3 and with a clutch or bell housing 4 on one side thereof and communicating with the front compartment 2. The terms "front" and "rear" are used merely for the purpose of convenience. The clutch housing, as will be understood, is secured to the fly wheel housing of the engine.

5 designates a drive or clutch shaft, this having a bearing at 6 in the side of the gear box or the compartment 2 thereof remote from the clutch housing 4 and extending transversely through the compartment 2 into the clutch housing 4. It is shown as splined at its outer end for receiving the driven element or disk of the clutch. This clutch shaft is axially alined with the crank shaft of the engine and has a reduced portion 7 mounted in the pilot bearing in the end of the crank shaft in the usual manner. The clutch construction forms no part of this invention.

8 and 9 are input and output shafts journalled in suitable bearings in the end walls of the gear compartment 3, these being parallel to each other. These shafts extend in a general direction at a right angle to the axis of or the vertical plane of the axis of the clutch shaft 5, and the output shaft 9 has an extension 10 extending through the compartment 2 crosswise of and below the clutch shaft 5 and journalled at 11 in the outer end wall of the compartment 2. It extends through the compartment 2 and is provided at its outer end with a coupling member, as 12, for delivering the power of the output shaft 9. The power may be delivered to a propeller shaft and from the propeller shaft to the driving axle of the vehicle. The input shaft 8 extends into the compartment 2 and is connected to the clutch shaft through intermeshing beveled gears 13 and 14, the gear 14 on the shaft 5 and being located adjacent the bearing 6.

The change-speed gearing between the shafts 8 and 9 include a plurality of gear trains, here shown as four, for producing three speeds forward and reverse. Each of these gear trains include a gear fixed on or integral with, or rotatable with, one of the shafts 8 or 9 and a gear normally rotatable about the other of said shafts 8 or 9. Some or two of these gear trains include gears fixed on or rotatable with the shaft 8 and gears rotatable about the shaft 9 and the other two gear trains include gears fixed to the shaft 9 and gears rotatable about the shaft 8. Suitable means is provided for selectively clutching the gears rotatable about either of said shafts to said shafts.

15 and 16 designate a pair of intermeshing gears fixed to the shaft 8 and normally rotatable about the shaft 9 respectively. When the gear 16 is clutched to the shaft 9, first speed forward is produced. 17 and 18 designate another pair of gears fixed to the shaft 8 and rotatable about the shaft 9, respectively, these gears meshing with an idler gear 19 suitably mounted in the gear box. This train of gears, particularly the gears 17 and 18 are opposed to or spaced apart from the gears 15 and 16. When the gear 18 is clutched to the shaft 9, reverse speed is produced. 20 and 21 designate respectively a pair of intermeshing gears rotatable about the shaft 8 and fixed to the shaft 9. When the gear 20 is clutched to the shaft 8, third or high speed forward is produced. 22 and 23 designate a pair of gears also rotatable about the shaft 8 and fixed to the shaft 9 respectively and opposed to or spaced from the gears 20 and 21. When the gear 22 is clutched to the shaft 8, second speed forward is produced.

The gears 16 and 18 and the gears 20 and 22 are selectively clutched respectively to the shafts 9 and 8 by clutches designated generally 24 and 25, the clutch 24 being located on the shaft 9 between the gears 16 and 18 and including synchronizing means. It includes a section 26 having clutch teeth 27 and 28 on opposite sides thereof for coacting with complemental clutch faces on the gears 16 and 18 and also a friction clutch section or sleeve 29 having friction clutch faces at its opposite ends for coacting respectively with friction clutch faces on the gears 16 and 18. The toothed and friction sections 26 and 29 are impositively coupled together in any suitable manner, as by spring-pressed poppets, and the construction is such that a shifting force applied in one direction or the other to the shifting collar 30 is first applied, due to the connection at 31, to the toothed section 26 and through the section 26 to the friction section 29, and the friction section comes in contact with the complemental friction face of the gear 16 or 18 before the clutch teeth of the section 26 and the gear 16 or 18 come into engagement, so that the speed of the gear 16 or 18 is synchronized with that of the shaft 9, before the toothed section 26 can be completely shifted to engage the clutch teeth. The spring-pressed poppets, during the shifting of the final shifting clutch teeth into engagement, cam out of the notch in the sleeve 29 in which it is located. The clutch embodies other means for blocking the additional shifting until the speeds are synchronized but the specific construction of this synchronizing clutch and blocking mechanism per se forms no part of this invention.

The clutch 25 is of a construction similar to that of the clutch 24. The collar 30 may be selected and shifted in any suitable manner, either by the conventional selecting and shifting gear lever having a lateral selecting movement into interlocking coaction and a fore and aft shifting movement with shifter blocks or rods, the blocks or rods having forks working in the groove 32 of the collar 30, as will be understood by those skilled in the art. The blocks or forks may be shifted by any power operated shifting mechanism located near or remote from the gear box, as will be understood by those skilled in the art.

By this arrangement of gears and synchronizing clutches, synchronizing takes place in all speed changes including reverse, and the arrangement of gears and synchronizing clutches is particularly simple and compact.

This gearing is particularly applicable for buses and the like having the engine and gear boxes in the rear, especially where the engine and gear box are not arranged in alinement, as the entire installation is arranged in an extremely compact space.

What I claim is:

In a transmission unit, a unitary housing comprising three separate compartments including a gear box, a clutch housing and a clutch shaft compartment, the transmission gearing in the gear box including spaced apart input and output shafts extending substantially parallel to each other, and means operable to effect different speed ratios between the latter shafts, the clutch shaft compartment being arranged at one end of the gear box, and the clutch housing on one lateral side of the clutch shaft compartment and the gear box, all whereby the compartments are arranged in right angle triangular formation, the clutch shaft extending through the clutch shaft compartment crosswise of the axis of the input shaft and being journalled at its end remote from the clutch housing in a wall of the clutch shaft compartment, the output shaft extending beyond the input end of the input shaft through the clutch shaft compartment and being journalled near its outer end in a wall of the clutch shaft compartment, and motion transmitting means between the clutch shaft and the input shaft.

CARL D. PETERSON.